United States Patent
Neri

(10) Patent No.: US 8,226,339 B2
(45) Date of Patent: Jul. 24, 2012

(54) SPIN RESISTANT THREADED INSERT

(75) Inventor: Frank Neri, Valencia, CA (US)

(73) Assignee: AVK Industrial Products, Valencia, CA (US)

( * ) Notice: Subject to any disclaimer, the term of this patent is extended or adjusted under 35 U.S.C. 154(b) by 157 days.

(21) Appl. No.: 12/070,354

(22) Filed: Feb. 14, 2008

(65) Prior Publication Data

US 2008/0193256 A1 Aug. 14, 2008

Related U.S. Application Data

(60) Provisional application No. 60/901,806, filed on Feb. 14, 2007.

(51) Int. Cl.
*F16B 37/04* (2006.01)

(52) U.S. Cl. ....... 411/181; 411/80.6; 411/161; 411/183; 411/187

(58) Field of Classification Search .............. 411/37, 411/38, 71, 181, 183, 187, 188, 73, 452, 411/15, 80.6, 91, 104, 112, 131, 158, 161, 411/171, 176, 189, 451.4, 463, 969
See application file for complete search history.

(56) References Cited

U.S. PATENT DOCUMENTS

| | | | | |
|---|---|---|---|---|
| 1,112,525 A * | 10/1914 | Darling | ....... | 248/187.1 |
| 2,343,143 A * | 2/1944 | Gill | ....... | 411/38 |
| 5,051,048 A * | 9/1991 | Maddox | ....... | 411/34 |
| 5,078,547 A * | 1/1992 | Calandra et al. | ....... | 405/259.5 |
| 6,161,998 A * | 12/2000 | Brown | ....... | 411/34 |
| 6,637,994 B2 * | 10/2003 | Leistner | ....... | 411/181 |
| 6,761,520 B1 * | 7/2004 | Dise | ....... | 411/38 |
| 2005/0031433 A1* | 2/2005 | Neri | ....... | 411/180 |
| 2005/0047893 A1* | 3/2005 | Schwarzbich | ....... | 411/546 |
| 2005/0095078 A1* | 5/2005 | Makino | ....... | 411/183 |
| 2005/0158138 A1* | 7/2005 | Schneider | ....... | 411/43 |
| 2006/0291974 A1* | 12/2006 | McGee et al. | ....... | 411/171 |

* cited by examiner

*Primary Examiner* — Victor Batson
*Assistant Examiner* — Roberta Delisle
(74) *Attorney, Agent, or Firm* — James M. Duncan, Esq.; Klein, DeNatale, Goldner, et al.

(57) ABSTRACT

A threaded collapsible insert is utilized for insertion into a hole in a workpiece for subsequent installation of a threaded fastener. The insert has a axially-aligned opening extending for most or all of the entire length of the body of the insert. The hollow body has a first section and a second section, where the wall thickness of the first section is less than the wall thickness of the second section, such that the first section preferentially collapses upon application of a linear force to the insert. The second section comprises internal threads for engaging the fastener. The head member has a top side and an underside. The underside of the head member may comprise a plurality of knurls radiating outwardly on the underside of the flange. The outside of the first section may also comprise a plurality of axially aligned rib members extending from the proximal end to the distal end.

9 Claims, 5 Drawing Sheets

SPIN RESISTANT THREADED INSERT

CROSS-REFERENCE TO RELATED APPLICATION

U.S. Provisional Application No. 60/901,806 for this invention was filed on Feb. 14, 2007, for which application this inventor claims domestic priority.

BACKGROUND OF THE INVENTION

The present invention relates to an apparatus for attaching threaded fasteners to a workpiece, which usually will have a first side, for which access is available, and a second side, which may be a blind side where access is not available. More particularly, this invention relates to a threaded insert having structural features which increase the resistance of the insert from spinning within the workpiece.

It is known to use threaded rivet nuts or threaded inserts as anchors for threaded fasteners in a number of different applications, including thin wall applications, such as sheet materials fabricated from metals, plastics and composites, which may be too thin to be tapped with threads. In many cases, there is access only to one side of the workpiece, which are known as "blind" applications. In general, the workpiece is drilled or punched and the anchor device is placed within the resulting hole by an installation tool. When the installation tool is activated, a portion of the anchor device on the blind side of the workpiece is deformed to create an enlargement which prevents removing the device from the hole. After the installation tool is removed, a threaded fastener may be inserted into a threaded portion of the device.

It is to be understood that the term "workpiece" as used in this specification refers to any material for which it is desirable to use any of the disclosed embodiments of this device. Typically, the materials for which the threaded insert has the greatest utility are blind applications for thin walled materials such as sheet metal or sheet plastic. Where there is only ready access to one side of a workpiece, it is necessary to employ anchors which may be completely deployed and installed on the visible side of the workpiece. As with other anchoring devices used in blind applications, the threaded insert must have features which retain the device within the workpiece and allow a threaded fastener to be inserted and tightened without the threaded insert spinning or rotating.

In addition, it is often desirable that the workpiece suffer minimal distortion when the threaded insert or fastener is installed to preserve the visual appeal of the workpiece. For example, if the workpiece comprises exposed panels of an automobile, it is desirable that the panels are not visibly deformed by the installation of threaded inserts and the related fasteners. Typically, a portion of the threaded insert on the blind side of the workpiece is plastically deformed into a bubble or secondary flange which is larger than the diameter of the hole in the workpiece, thereby preventing withdrawal of the threaded insert from the hole. It is desirable that the anchor device resist spinning or rotating within the hole and that the device be resistant to being pulled from the hole.

SUMMARY OF THE INVENTION

The present invention is directed to a threaded insert which meets the needs identified above. An embodiment of the device may be utilized as an insert for plastic/composite applications which require increased spin out values over standard type rivet nuts. During installation of the fastener the aggressive knurls on the outer diameter of the body in conjunction with knurls under the head "dig" into the parent material, thus filling the voids between the knurls and resulting in a substantial increase in spin out values.

One embodiment of the disclosed apparatus is a threaded insert for inserting in a hole in a workpiece, where the workpiece has a first side and a second side, where the second side may be a blind side having no available access. The hole in the workpiece has a circular cross-section. The threaded insert comprises a first flange for being retained on the first side of the workpiece. The configuration of the knurls on the underside of the first flange may be such that a plurality of knurls radiate outwardly on the underside of the flange. As shown in FIGS. 1, 2 and 4, the knurls may be spaced such that the arcs defined by any two of the knurls are equal in length.

The threaded insert further comprises a hollow body, comprising a first section and an axially adjacent second section, the first section comprising a proximal end attached to the first flange and a distal end at which point the first section integrally transitions into the second section. The first section comprises a plurality of axially-oriented knurls extending axially from the proximal end to the distal end. The first section is plastically deformable to form an enlarged portion on the second side of the workpiece to prevent withdrawal of the threaded insert from the hole. The second section has internal threads adapted to receive a threaded fastener.

DETAILED DESCRIPTION OF THE EMBODIMENTS

Figure 1:
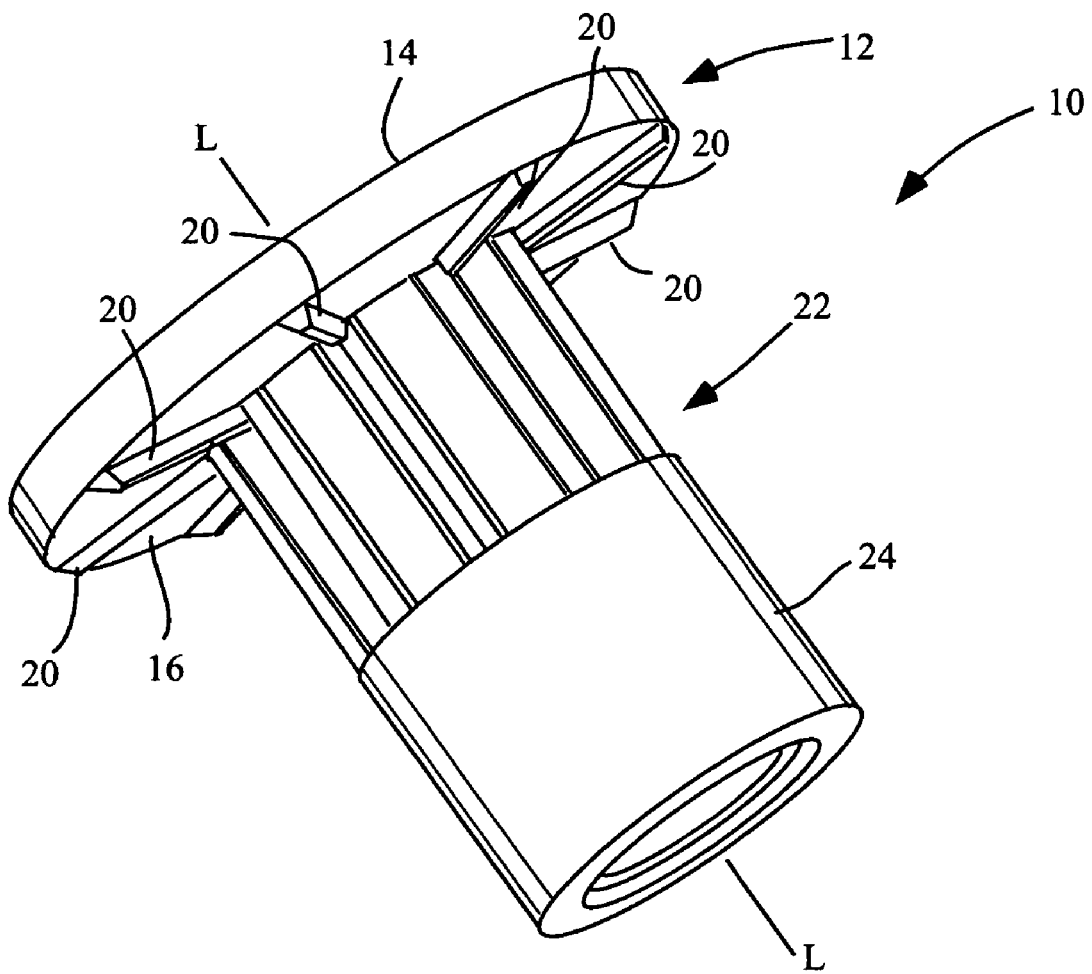
FIG. 1 is a perspective view of an embodiment of the threaded insert, showing axially-oriented knurls.
Figure 2:
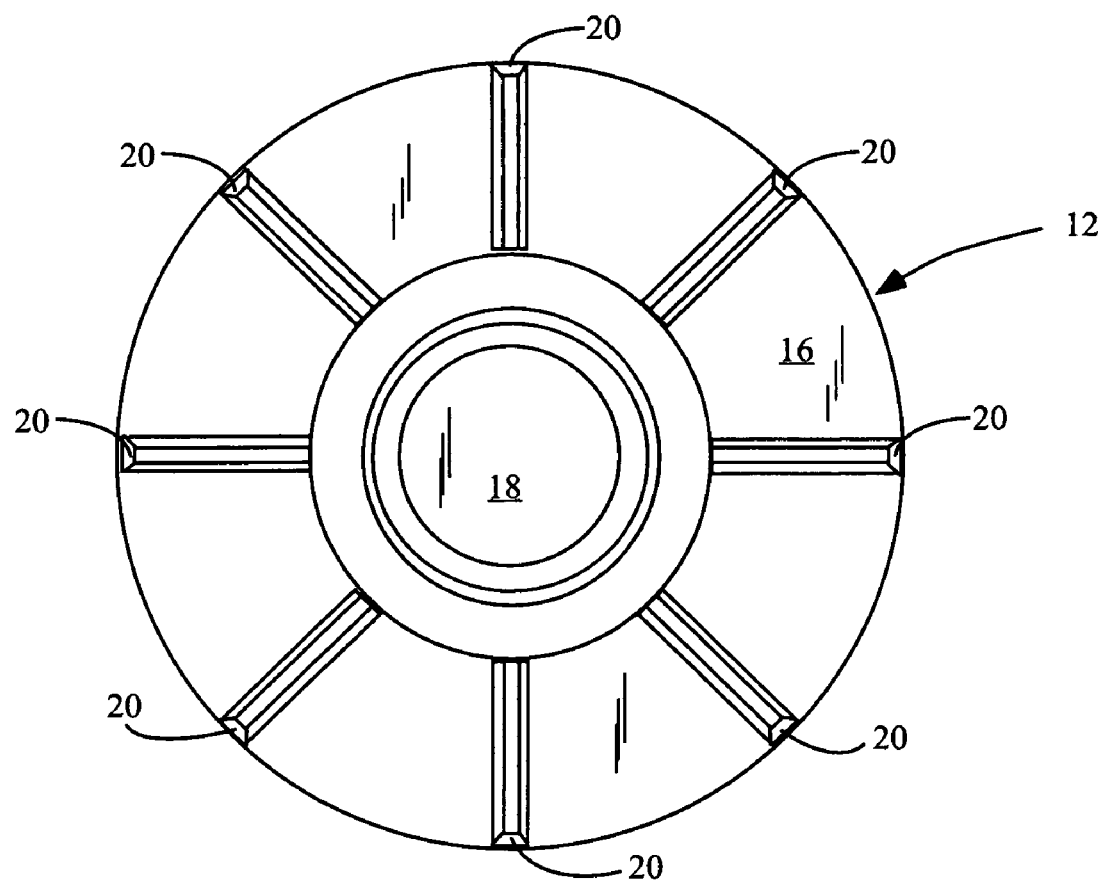
FIG. 2 is a top view of the embodiment of the threaded insert shown in FIG. 1, showing the underside of the first flange.
Figure 3:
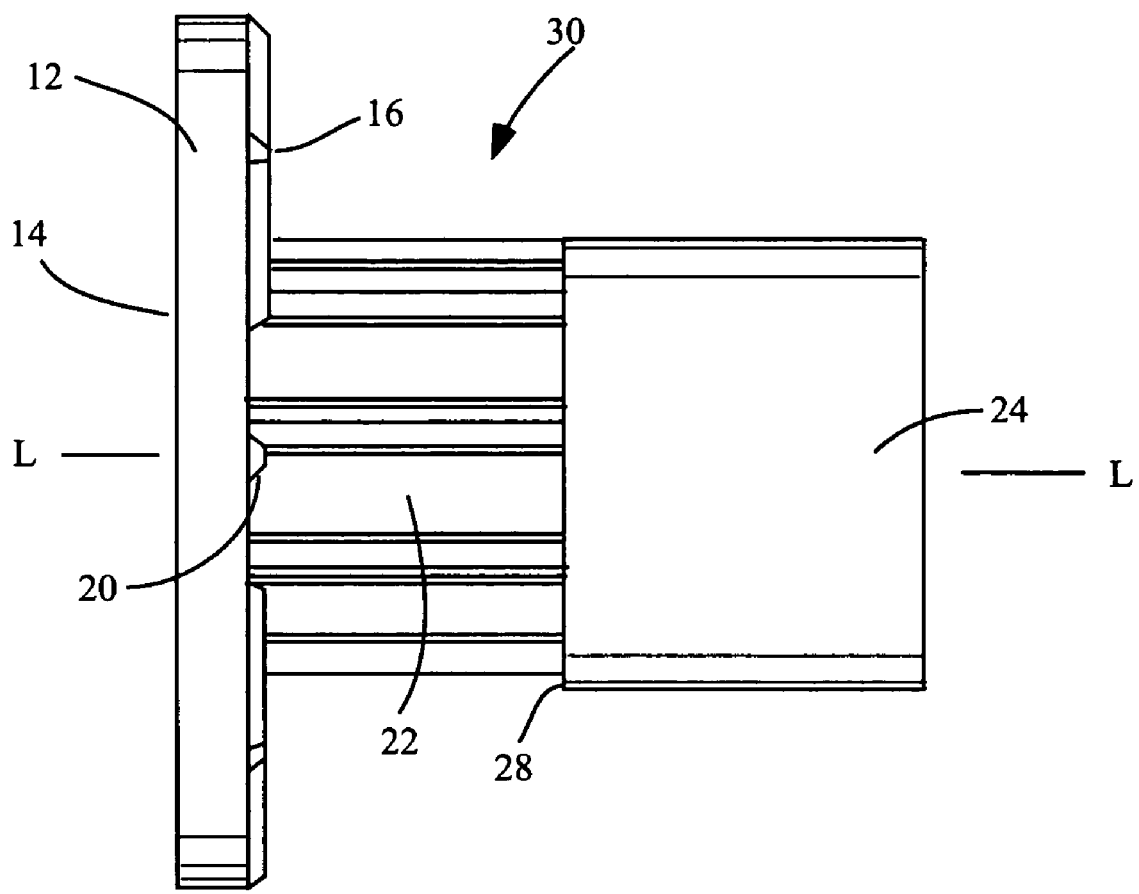
FIG. 3 is a side view of the embodiment of the threaded insert shown in FIG. 2.
Figure 4:
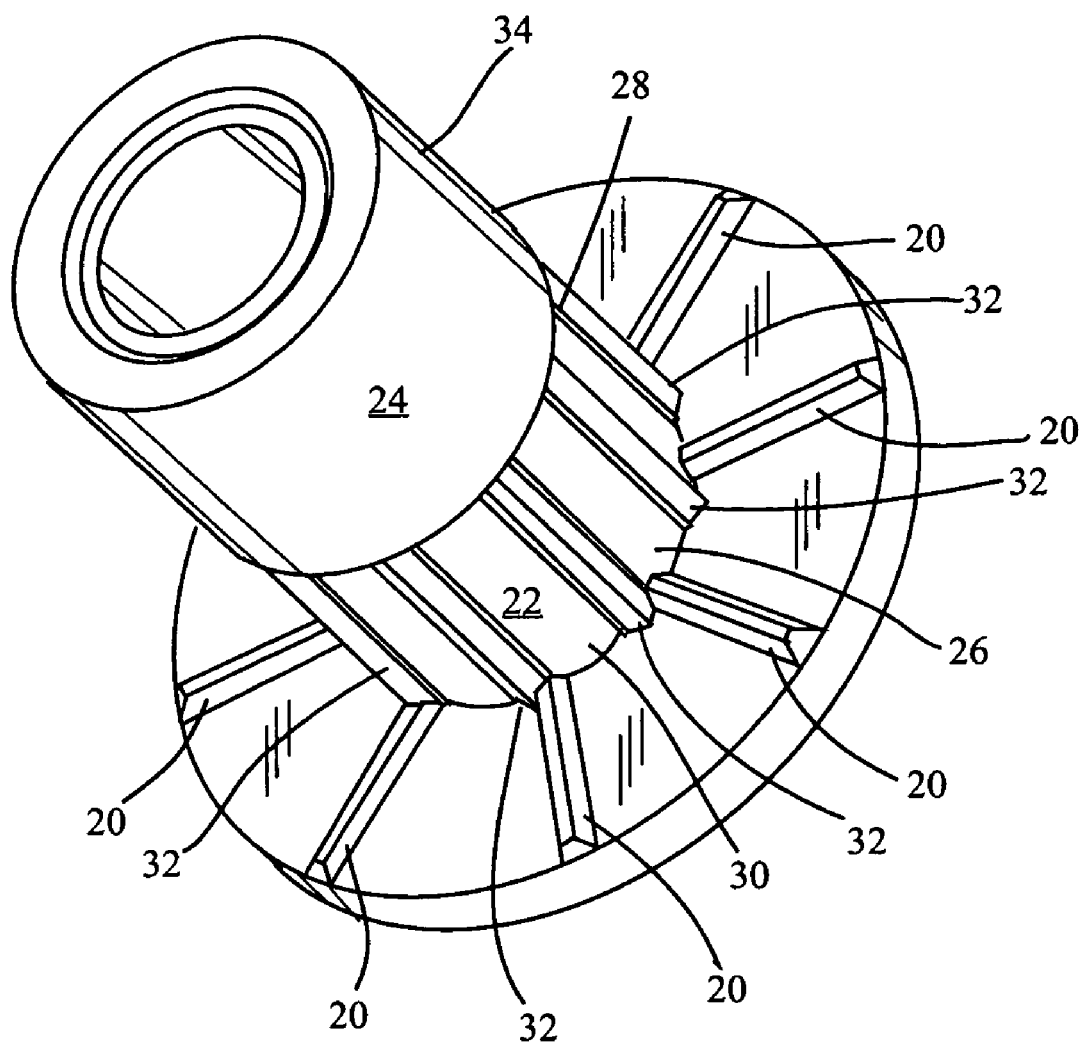
FIG. 4 shows a perspective view of the embodiment of the threaded insert shown in FIGS. 1 through 3.

Referring now to the figures, FIG. 1 shows an embodiment of the disclosed threaded insert 10. Insert 10 comprises circular head member 12. Circular head member 12 comprises a top side 14 and an underside 16. Head member 12 comprises a circular opening 18 which has a center axis L which coincides with the center axis of the circular head member, such that the circular opening 18 is centrally located within head member 12. Circular opening 18 may extend through the entire length of the threaded insert 10, although another embodiment might include a closed end. The underside 16 of head member 12 comprises a plurality of knurls 20 which radiate outwardly on the underside 16 of circular head member 12. As shown in FIG. 1, the knurls may comprise a polygonal profile.

Insert 10 comprises a hollow body having a first section 22 and an axially adjacent second section 24. First section 22 comprises a proximal end 26, which transitions into head member 12. First section 22 further comprises a distal end 28 wherein the first section 22 terminates and the second section 24 begins. The first section 22 further comprises outside surface 30. The outside surface 30 comprises a plurality of axially aligned rib members 32 extending from the proximal end 26 to the distal end 28. Rib members 32 are integral to the structure of first section 22. The rib members 32 may comprise a polygonal cross-section, including a triangular cross-section, or other cross-section.

Figure 5:
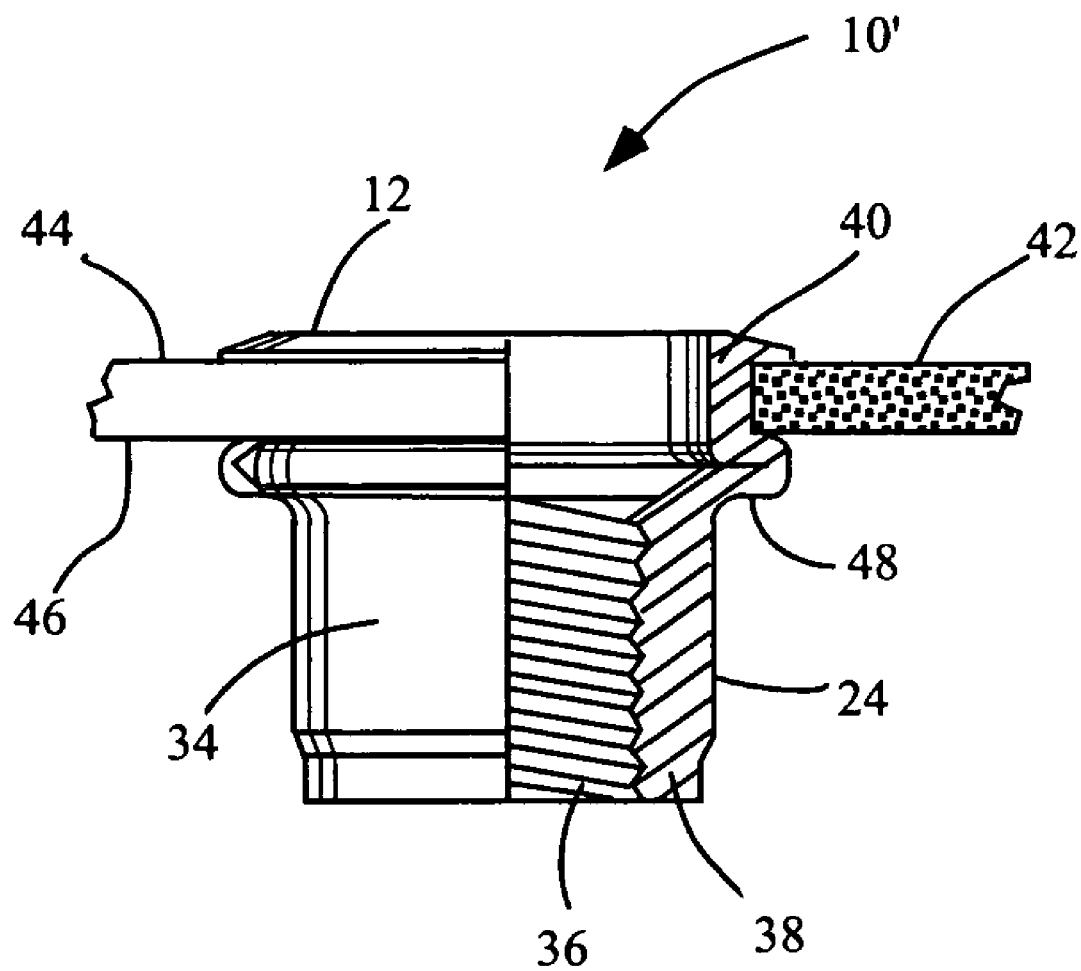
FIG. 5 shows a quarter-cut-away view of an embodiment of the threaded insert, show in an installed condition in a workpiece.

Second section 24 comprises a hollow cylinder having a smooth second outside surface 34 and a threaded internal surface 36. As shown best in FIG. 5, the thickness of wall 38 in the second section 24 is greater than the thickness of wall 40 of first section 22, thereby allowing the first section to preferentially collapse as shown in FIG. 5 when the insert is installed by application of a liner force to the insert. The end of second section 24 may be open or closed depending upon the particular application.

An installed threaded insert 10' is shown in FIG. 5. The insert is typically installed in a hole in a workpiece 42, where the workpiece has a visible side 44 and a blind side 46. As depicted in FIG. 5, when threaded insert 10' has been installed in workpiece 42, the installed insert 10' is retained within the hole of the work piece by circular head member 12 on the visible side 44, and bubble 48 which is formed by the collapse of first section 22. When collapsed, the rib members 32 laterally extend into the opening, creating structural members which inbed into the inside edges of the opening, creating greater resistance to spinning of the threaded insert 10' when a threaded fastener is made up into the threads 36 of the insert. Likewise, knurls 20 dig into the surface of visible side 44 of the workpiece 42, adding to the spin resistance of the threaded insert 10' Threads 36 may vary according to the needs of the particular application and may comprise known thread types, pitch, and geometry.

The threaded insert 10 is fabricated from metal and metal alloy materials which have mechanical properties suitable for plastic deformation, such that the first section will collapse yet the second section retains its integrity and will retain a threaded fastener.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. A threaded insert for insertion in a hole in a workpiece, the workpiece having a visible side and a blind side, said threaded insert having a pre-installation configuration and an installed configuration, the pre-installation configuration comprising:
   a circular head member for being retained on the visible side of the workpiece, the head member comprising a top side and an underside, the head member comprising a circular opening having a center axis coinciding with the center axis of the circular head member, the underside comprising a plurality of knurls radiating outwardly on the underside of the head member;
   a hollow body, comprising a first section and an axially adjacent second section, the first section comprising a proximal end attached to the head member and a distal end wherein the first section terminates and the second section begins, wherein the circular head member comprises an inside edge abutting the proximal end and an outside peripheral edge, wherein each knurl radially extends from the inside edge to the outside peripheral edge and each knurl has a cross-sectional area, the cross-sectional area constant from the inside edge to the outside peripheral edge;
   said first section further comprising a first outside surface, the first outside surface comprising a plurality of axially aligned outwardly extending rib members extending from the proximal end to the distal end, each rib member having a constant cross-sectional area from the proximal end to the distal end, the first outside surface having no openings; and
   the second section comprising a hollow cylinder having a smooth second outside surface and a threaded internal surface, wherein the wall thickness of the second section is thicker than the wall thickness of the first section,
   wherein the first section comprises a first outside diameter and the second section comprises a second outside diameter, wherein the first outside diameter is smaller than the second outside diameter except for the axially aligned outwardly extending rib members which extend out to the second outside diameter,
   wherein, in the installed configuration, the plurality of axially aligned outwardly extending rib members are collapsed to engage the blind side of the workpiece.

2. The threaded insert of claim 1 wherein each rib member comprises a polygonal cross section.

3. The threaded insert of claim 2 wherein each rib member comprises a triangular cross section.

4. The threaded insert of claim 1 wherein each knurl comprises a polygonal profile.

5. The threaded insert of claim 4 wherein each knurl comprises a trapezoidal profile.

6. The threaded insert of claim 1 wherein each rib member comprises a first end, the first end of each rib member abutting a knurl on the underside of the head member.

7. A threaded insert for insertion in a hole in a workpiece, the workpiece having a visible side and a blind side, said threaded insert having a pre-installed configuration and an installed configuration, the pre-installation configuration comprising:
   a circular head member for being retained on the visible side of the workpiece, the head member comprising a top side and an underside, the head member comprising a circular opening having a center axis coinciding with the center axis of the circular head member;
   a hollow body, comprising a first section and an axially adjacent second section, the first section comprising a proximal end attached to the head member and a distal end wherein the first section terminates and the second section begins;
   said first section further comprising a first outside surface, the first outside surface comprising a plurality of axially aligned outwardly extending rib members extending from the proximal end to the distal end, each rib member having a constant cross-sectional area from the proximal end to the distal end, the first outside surface having no openings; and
   the second section comprising a hollow cylinder having a smooth second outside surface and a threaded internal surface, wherein the wall thickness of the second section is thicker than the wall thickness of the first section,
   wherein the first section comprises a first outside diameter and the second section comprises a second outside diameter, wherein the first outside diameter is smaller than the second outside diameter except for the axially aligned outwardly extending rib members which extend out to the second outside diameter,
   wherein, in the installed configuration, the plurality of axially aligned outwardly extending rib members are collapsed to engage the blind side of the workpiece.

8. The threaded insert of claim 7 wherein each rib member comprises a polygonal cross section.

9. The threaded insert of claim 8 wherein each rib member comprises a triangular cross section.

* * * * *